United States Patent [19]

Chin et al.

[11] Patent Number: 5,617,421
[45] Date of Patent: Apr. 1, 1997

[54] EXTENDED DOMAIN COMPUTER NETWORK USING STANDARD LINKS

[75] Inventors: Hon W. Chin, Palo Alto; Frederick Scott, Sunnyvale, both of Calif.

[73] Assignee: Cisco Systems, Inc., San Jose, Calif.

[21] Appl. No.: 261,393

[22] Filed: Jun. 17, 1994

[51] Int. Cl.$^6$ ..................................................... H04L 12/56
[52] U.S. Cl. ........................................................... 370/402
[58] Field of Search ............................... 370/85.15, 94.1, 370/94.2, 94.3, 60, 60.1, 61, 85.5, 85.6; 395/200.01, 200.1; 340/825.02, 825.03, 825.51, 825.52

[56] References Cited

U.S. PATENT DOCUMENTS

| | | | |
|---|---|---|---|
| 4,621,362 | 11/1986 | Sy | 370/85.13 |
| 4,627,052 | 12/1986 | Hoare et al. | 370/85.13 |
| 4,706,081 | 11/1987 | Hart et al. | 340/825.03 |
| 4,809,265 | 2/1989 | Hart et al. | 370/85.13 |
| 4,811,337 | 3/1989 | Hart | 370/85.13 |
| 4,866,421 | 9/1989 | Szczepanek | 340/825.52 |
| 4,933,938 | 6/1990 | Sheehy | 370/85.13 |
| 5,088,090 | 2/1992 | Yacoby | 370/85.13 |
| 5,151,897 | 9/1992 | Suzuki | 370/85.13 |
| 5,179,554 | 1/1993 | Lomicka et al. | 370/85.13 |
| 5,274,631 | 12/1993 | Bhardwaj | 370/60 |
| 5,394,402 | 2/1995 | Ross | 370/94.1 |

FOREIGN PATENT DOCUMENTS

| | | |
|---|---|---|
| 0302646 | 2/1989 | European Pat. Off. . |
| A10431751 | 6/1991 | European Pat. Off. . |
| A10517534 | 12/1992 | European Pat. Off. . |
| 8904578 | 5/1989 | WIPO . |

*Primary Examiner*—Douglas W. Olms
*Assistant Examiner*—Dang Ton
*Attorney, Agent, or Firm*—Cesari and McKenna

[57] ABSTRACT

A method for establishing and maintaining virtual network domains in a segmented computer network having a first domain and a second domain. A first table entry for a first endstation in a first forwarding table of a first switching fabric circuit is created. The first table entry includes domain information specifying that the first endstation is in the first domain and port information specifying that the first endstation is coupled to a first port. A packet having the first endstation as a source is received by the first port of the first switching fabric circuit, and a destination for the packet is determined. If the packet specifies a second endstation of the first domain as the destination, the packet is forwarded to the second endstation. If the destination for the packet specifies more than one endstation, the domain of the source of the packet is determined, and the packet is forwarded to the specified endstations of the first domain. For a second embodiment, source and destination information are compared to determine forwarding information for a packet, and the packet is forwarded as specified by the forwarding information. For a third embodiment, intelligent selection between multiple paths to the same endstation is provided by the comparison of source and destination forwarding information.

44 Claims, 10 Drawing Sheets

EXTENDED DOMAIN COMPUTER NETWORK USING STANDARD LINKS

The present invention relates generally to local area networks and specifically to the creation and maintenance of virtual network domains in a segmented network.

BACKGROUND OF THE INVENTION

The Institute of Electrical and Electronic Engineers (IEEE) has promulgated a number of standards regarding local area networks (LANs). LANs such as Ethernet (IEEE standard 802.3) provide for a multiplicity of interconnected endstations that allow a multiplicity of users to share information in an efficient and economical manner. Each endstation of a network can typically communicate with every other endstation that is physically connected to that network.

In some circumstances it is desirable to provide isolation between two or more groups of users. The simplest solution is to create a number of LANs that are physically isolated from one another. This solution is not cost-effective, however, because it typically leads to underutilization of the resources for each network. A second solution involves the establishment of a single physical "segmented network" and the creation of two or more "virtual network domains" within the segmented network.

A virtual network domain is a subset of the endstations coupled to a physical network, wherein each of the endstations in the subset may communicate with another but cannot communicate with endstations that are not part of the subset. Thus, a single physical network may be divided up into a multiplicity of conceptual or virtual networks, and the desired isolation between user groups can be provided in a single physical network.

Segmented networks are typically created to increase the throughput of a network that has a large number of endstations. As the number of endstations of a network increases, the effective throughput for each endstation of the network decreases. By breaking the network into smaller interconnected segments that each have fewer endstations, the load for each segment in the network is reduced, leading to increased throughput of the network. Interconnection of the segments of prior segmented networks is achieved by connecting several individual LAN segments to the ports of a "switching fabric circuit". The term "switching fabric circuit" as used here is meant to encompass any circuit that provides for the processing and forwarding of information between LAN segments in a segmented network. For example, one prior switching fabric circuit includes a number of conventional Ethernet bridges connected to a backbone network that is controlled by a system processor. The system processor is responsible for filtering and forwarding frames of data between LAN segments. A second prior switching fabric circuit is the Etherswitch™, sold by Kalpana, Inc., of Sunnyvale, Calif., and described in U.S. Pat. No. 5,274,631, of Bhardwaj, issued on Dec. 28, 1993, entitled *Computer Network Switching System*. The Etherswitch™ includes a number of packet processors, one for each port, that are each connected to multiplexor logic. A system processor manages forwarding tables and assists in the learning process whereby each packet processor "learns" the location of each endstation in the segmented network.

For a segmented network that employs a single switching fabric circuit, implementing virtual network domains is relatively straightforward. Each segment is assigned as being in a particular domain such that only endstations connected to segments of the same domain can communicate with one another. The switching fabric circuitry is physically configured such that only those ports that are connected to segments of like domain may be "connected" to one another for communication between segments.

Implementing virtual network domains in a segmented network that has more than one switching fabric circuit is a more complicated task. Conceptually, this requires extending domains across an interswitch link through ports that must support traffic for all domains in the network and therefore cannot be assigned to a single domain.

FIG. 1 shows a prior art segmented network having two switching fabric circuits that each support two virtual networks. Switching fabric circuit 100 has four ports. A first port is connected to LAN segment 110, which is assigned to domain "X". A second port is connected to LAN segment 120, which is assigned to domain "Y". A third port is connected to LAN segment 130, which, like LAN segment 110, is assigned to domain X. A fourth port is connected to switching fabric circuit 200 via interswitch link 300. Switching fabric circuit 200 has ports coupled to LAN segments 210, 220, and 230. LAN segments 210 and 230 are assigned to domain Y, wherein LAN segment 220 is assigned to domain X.

FIG. 2 shows the typical format of a frame 150 of data according to the IEEE 802 standard for LANs. The frame is the unit of network transactions. Each frame includes a destination address field 157 and a source address field 158. For segmented networks, the source address field is typically used only for the learning process in establishing forwarding tables for the switching fabric circuits. A typical prior learning process is defined in IEEE standard 802.1(d). The destination address field 157 is used for forwarding the frame to the appropriate endstations. The information contained in the destination address field determines whether the frame is to be an unicast transaction, a multicast transaction, or a broadcast transaction.

Intraswitch unicast transactions between LAN segments of the same domain present no inherent difficulties because the destination endstation is defined and the ports of the switching fabric circuit are manually configured such that only segments of the same domain can communicate with one another. Once the location of the destination endstation in the domain has been learned, packets bound for the destination endstation will consistently be forwarded to the port to which the LAN segment of the destination endstation is connected. The locations of endstations may be learned using prior transparent bridge learning techniques. Similarly, interswitch unicast transactions between remote LAN segments of the same domain present no problems because the location of the destination endstation can be learned.

Difficulties arise when a switching fabric circuit receives either a broadcast packet or a unicast packet specifying an unknown destination endstation from another switching fabric circuit. Broadcast packets by definition have no specific destination address. Unicast packets specifying unknown destination endstations are broadcasted to determine the location of the destination endstation during the learning process Therefore, a unicast packet specifying an unknown destination broadcast packet, express or implied, from switching fabric circuit 100 via interswitch link 300, switching fabric circuit 200 cannot, without more information, know where to forward the broadcast packet. The frame must either be broadcast to all LAN segments connected to switching fabric circuit 200, or it must not be forwarded. In the first case, the desired isolation of the virtual networks is violated and the load of the virtual networks are unnecessarily increased. In the second case, information is lost. Multicast packets present similar difficulties.

Prior art solutions for maintaining isolation without the loss of information focus on the interconnection between switching fabric circuits. These solutions require that additional information be sent with each packet that is transmitted between switching fabric circuits. As the maximum packet size that can be sent by an endstation is defined by the IEEE 802 standard implemented by the LAN segments, additional information typically cannot be included in the packet with a requisite guarantee that the maximum packet size will not be exceeded. One solution requires that the link between switching fabric circuits operate according to a different LAN protocol having a larger packet size such that each frame of data is encapsulated within a larger packet of data that contains equivalence class information. Such encapsulation 180 is shown in FIG. 3. Encapsulation necessitates the presence of additional circuitry in the interconnecting ports of the switching fabric circuits for encapsulating the LAN frames for transmission and for stripping the LAN frames from the packets upon receipt. Encapsulation may require that the interswitch link 300 be a proprietary link that does not support the LAN standard of the LAN segments.

A second solution allows the link between switching fabric circuits to be of the same LAN standard but requires an additional protocol to convey the equivalence class information. For example, each packet to be sent between switching fabric circuits is sent as two packets. The first packet conveys the equivalence class information and the second packet conveys the information of the original packet. The use of an additional protocol similarly require additional circuitry which may be proprietary.

SUMMARY AND OBJECTS OF THE INVENTION

Therefore, one object of the present invention is to provide a segmented computer network having virtual network domains that uses the same standard links for LANs between switching fabric circuits as used by the LAN segments of the segmented computer network.

Another object of the present invention is to provide a method for extending virtual network domains across switching fabric circuits such that standard LAN packets are exchanged between switching fabric circuits via standard LAN interswitch links that implement the same LAN standard used by the LAN segments of the segmented network.

Another object of the present invention is to provide a method for maintaining isolation between virtual network domains.

A further object of the present invention is to provide a method for the intelligent selection of paths to a remote endstation wherein multiple paths are possible.

These and other objects of the invention are provided for in a first embodiment by a method for establishing and maintaining virtual network domains in a segmented computer network having a first domain and a second domain. A first table entry for a first endstation in a first forwarding table of a first switching fabric circuit is created. The first table entry includes domain information specifying that the first endstation is in the first domain and port information specifying that the first endstation is coupled to a first port. A packet having the first endstation as a source is received by the first port of the first switching fabric circuit, and a destination for the packet is determined. If the packet specifies a second endstation of the first domain as the destination, the packet is forwarded to the second endstation. If the destination for the packet specifies more than one endstation, the domain of the source of the packet is determined, and the packet is forwarded to the specified endstations of the first domain.

A second embodiment includes a method in which a packet having a source address field and a destination address field is received by a first switching fabric circuit. A look-up is performed on the destination address field to produce destination information, and another look-up is performed to produce source information. The destination and source information are compared to produce forwarding information, and the packet is forwarded as specified by the forwarding information. The method of the second embodiment is especially useful when locally defined addresses are present in the segmented network or when the packet is a multicast packet specifying less than all ports for a particular virtual network domain.

A third embodiment provides a method for quickly and intelligently selecting one of a plurality of paths from a first switching fabric circuit to a first endstation of a second switching fabric circuit. A table entry for the first endstation is created in a forwarding table of the first switching fabric circuit. The table entry includes destination forwarding information specifying a first path to the first endstation and a second path to the first endstation. When a packet specifying the first endstation as a destination for the packet is received by the first switching fabric circuit, the first switching fabric circuit performs a look-up on the destination address field of the packet to retrieve the destination forwarding information for the first endstation. The first switching fabric circuit also performs a look-up on the source address field to retrieve source forwarding information of a source of the packet. The source forwarding information is compared to the destination forwarding information to produce final forwarding information, wherein the final forwarding information specifies only one of the first and second paths. The packet is then forwarded to the first endstation via the path specified by the final forwarding information.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
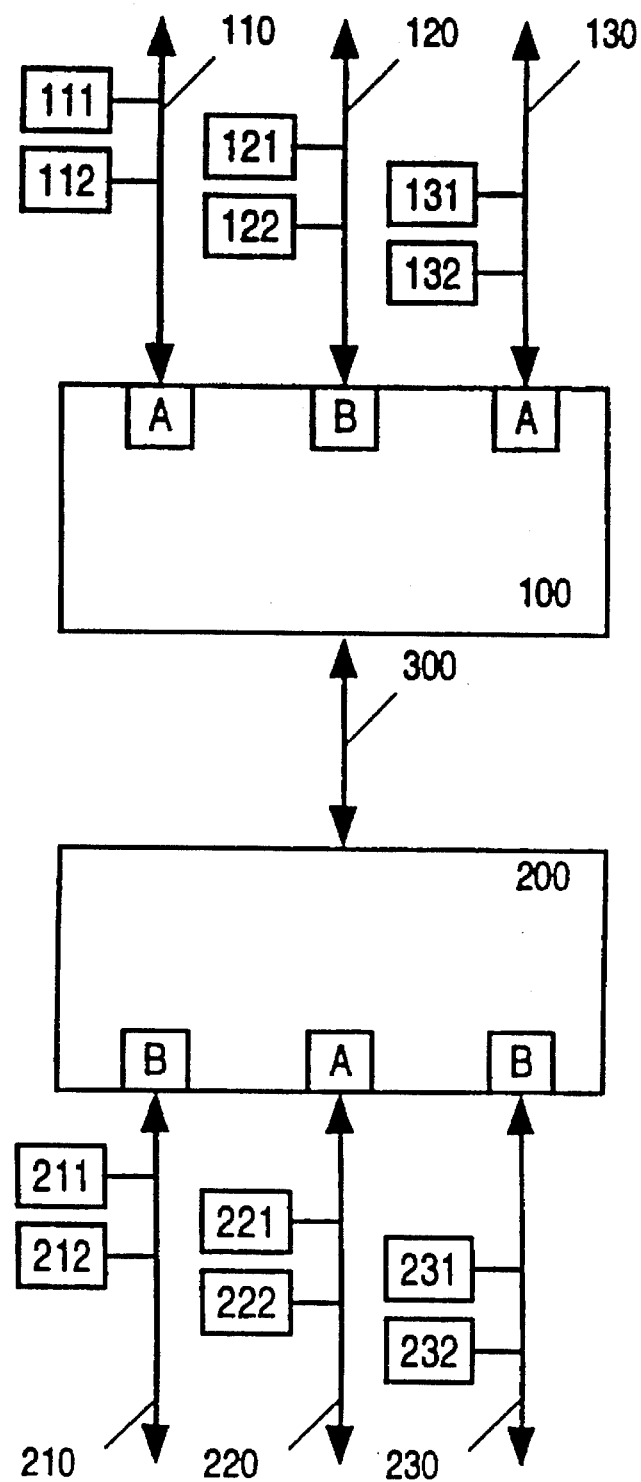
FIG. 1 shows a prior art segmented computer network.

A method and apparatus for extending virtual network domains between switching fabric circuits of a segmented computer network using standard links are described in detail below. The segmented computer network includes at least two switching fabric circuits. Each switching fabric circuit maintains a forwarding table regarding learned endstations of the segmented computer network. Each entry of the forwarding table includes domain information specifying the domain of the learned endstation. Forwarding table entries are shared between switching fabric circuits via interswitch links by enclosing the forwarding table entries in the data field of standard LAN packets. If a broadcast or multicast packet is received, the receiving switching fabric circuit performs a look-up of its forwarding table based on the source address field of the broadcast or multicast packet.

The term "standard" as used herein refers to apparatus that operate according to an industry standard as promulgated by the IEEE or equivalent national or international organization. Using standard links, as opposed to nonstandard or "proprietary" links, provides consumers the advantage of more vendors from which to purchase standard parts. Methods described herein are drawn to examples where standard links are implemented; however, the methods may be used in any segmented computer network that exchanges packets or frames, if the packets or frames include both source address and destination address fields.

To facilitate understanding of the various examples, certain labeling conventions have been adopted. First, each LAN segment is designated by a letter followed by a number. The letter indicates the switching fabric circuit to which the LAN segment is connected. If the letter of a LAN segment is followed by an odd number, that LAN segment is part of domain VN1. For example, LAN segment A1 is connected to switching fabric circuit A and is part of domain VN1. If the letter of a LAN segment is followed by an even number, that LAN segment is part of domain VN2. Therefore, LAN segment B2 is connected to switching fabric circuit B and is part of domain VN2. To be consistent, all endstations are indicated by an "S" followed by the letter of the corresponding switching fabric circuit and either an odd number, indicating that the endstation is part of domain VN1, or an even number, indicating that the endstation is part of domain VN2. Thus, endstation SA5 is connected to switching fabric circuit A and is part of domain VN1. Finally, each interswitch link between switching fabric circuits is designated by the letter of each of the switching fabric circuits to which the link is coupled. For example, link AC is coupled between switching fabric circuits A and C.

In addition to labeling conventions, certain terms are used consistently throughout the specification. A "unicast" transaction is a network transaction in which the destination address field of the packet indicates a single destination endstation. A "multicast" transaction is a network transaction in which the destination address field contains a predefined multicast address according to IEEE standards. A "broadcast" transaction is a network transaction in which all endstations of the virtual network domain are destinations of the packet. Broadcast transactions include broadcasts implied by a unicast packet having an unknown destination and station. "Interswitch" transactions are network transactions between two switching fabric circuits. "Intraswitch" transactions are network transactions that take place between LAN segments of a single switching fabric circuit. "Port of entry" refers to a port of the switching fabric circuit that has received a packet of data from its LAN segment or interswitch link for transmission to another port of the switching fabric circuit. "Port of exit" refers to a port of the switching fabric circuit that is to receive the packet sent by the port of entry via the switching fabric circuit.

Figure 4:
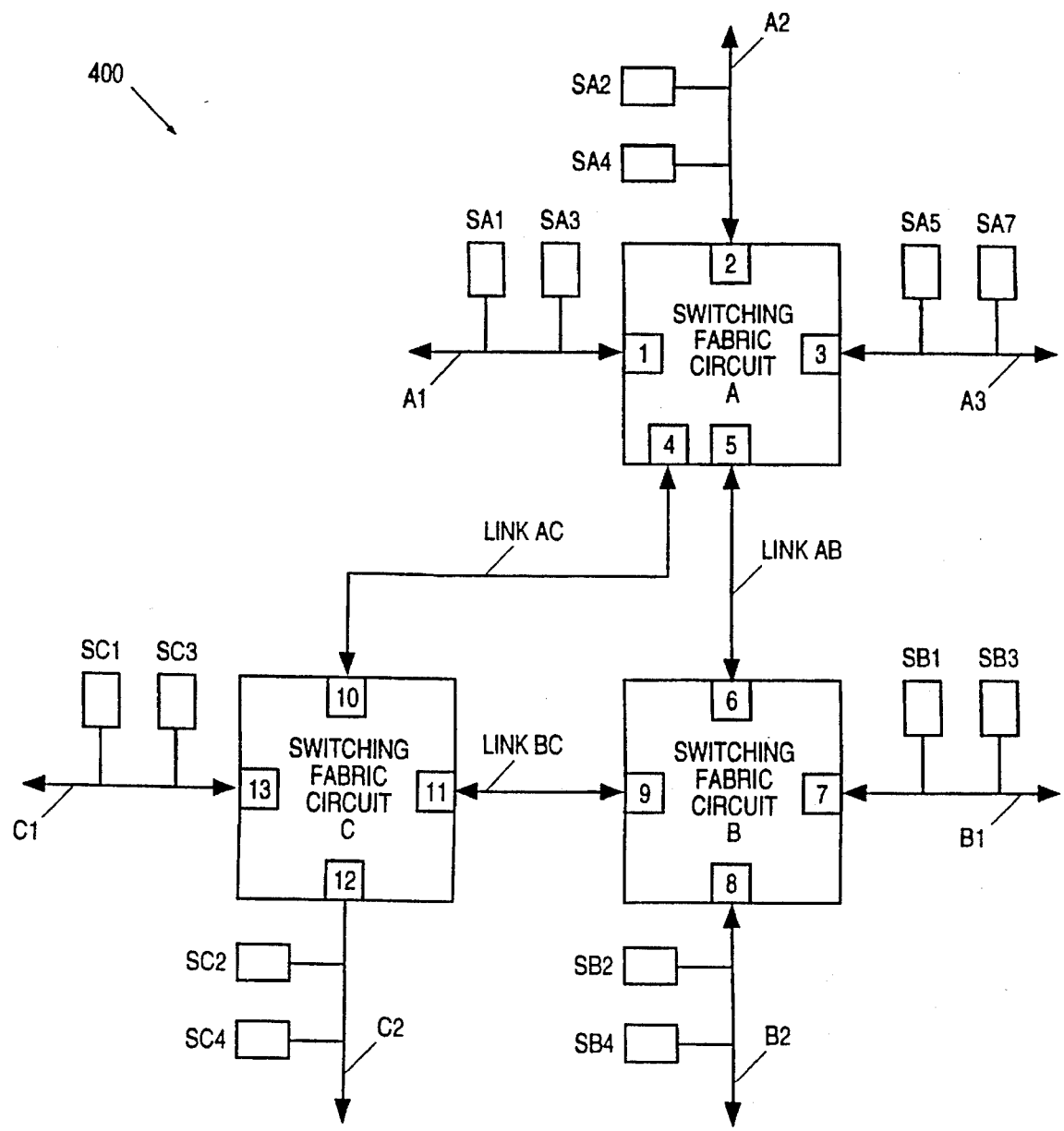
FIG. 4 shows a segmented computer network according to one embodiment.

FIG. 4 shows a segmented computer network according to one embodiment. Segmented computer network 400 includes: switching fabric circuits A, B and C; LAN segments A1-A3, B1-B2 and C1-C2; interswitch links AC, BC and AB; and a multiplicity of endstations (ES). Segmented computer network 400 supports two virtual network domains "VN1" and "VN2". The domains of segmented computer network 400 are preferably defined such that each LAN segment and its corresponding port are part of the same domain. Any endstation that is connected to a LAN segment is therefore part of the domain assigned to the LAN segment. In this manner, the ports that are connected to LAN segments can be physically configured to indicate their respective domains. As will be described below, a port may be configured to be part of more than one domain. Such ports are called "superports.". The number of virtual network domains ("domains") is theoretically unlimited. Further, each switching fabric circuit of segmented computer network 400 is not required to support all domains.

Each endstation and each switching fabric circuit is assigned a unique address. Any packet originating from a particular endstation or switching fabric circuit includes the address of the particular endstation or switching fabric circuit in the source address field. Similarly, any unicast packet having the particular endstation or switching fabric circuit as the destination includes the address of the particular endstation or switching fabric circuit in the destination address field.

As shown in FIG. 4, switching fabric circuit A includes ports 1–5. Port 1 is coupled to LAN segment A1. Port 2 is coupled to LAN segment A2. Port 3 is coupled to LAN segment A3. Finally, ports 4 and 5 are coupled to interswitch links AC and AB, respectively. Switching fabric circuit B includes ports 6-9. Ports 6 and 9 are coupled to interswitch links AB and BC, respectively, and ports 7 and 8 are coupled to LAN segments B1 and B2, respectively. Switching fabric circuit C includes ports 10–13. Ports 10 and 11 are coupled to interswitch links AC and BC, respectively. Port 12 is coupled to LAN segment C2, and port 13 is coupled to LAN segment C1. The number of ports for each switching fabric circuits is not limited to those used in this example.

The interswitch links and the LAN segments are each standard links for LANs. For example, where the LAN standard implemented for the segmented network is Ethernet (IEEE standard 802.3), the interswitch links and the LAN segments are comprised of coaxial cable, twisted-pair wire, or optical fiber. The links AC and AB need not be proprietary links or links of different LAN type because encapsulation is not required. The fact that the interswitch links are also standard LAN segments implementing the same LAN standard as the other LAN segments allows endstations to be connected to the interswitch links.

Each port, at a minimum, preferably includes transmit and receive circuitry according to the implemented LAN standard of the LAN segment or interswitch link to which it is connected. For Ethernet LAN segments and interswitch links, each port preferably includes medium access control (MAC) receive circuitry for receiving LAN packets from the LAN segment or interswitch link and MAC transmit circuitry for transmitting LAN packets over the LAN segment or interswitch link. Thus, ports can be standard LAN bridges, and the switching fabric circuits can be standard bridge and backbone bus bridging interconnection circuits that are each controlled by a single switching processor. It is preferable, however, that the ports further include circuitry for processing and forwarding packets to increase the throughput of the switching fabric circuits.

Generally, each switching fabric circuit creates and maintains at least one forwarding table containing information about the location of endstations in the segmented computer network 400. As endstations transmit packets, each switching fabric circuit "learns" about the transmitting endstations and creates table entries for the forwarding table that contain forwarding information regarding all endstations that have transmitted packets via the switching fabric circuit. Wherein all packets received by and transmitted from a switching fabric circuit are in standard LAN formats, the intraswitch packets typically include forwarding information regarding the port of entry and the port, or ports, of exit. To increase the throughput of the switching fabric circuits, each switching fabric circuit includes circuitry at each port for maintaining a local forwarding table that can be updated by the switching processor as required.

One embodiment uses a combination of "shared learning" between switching fabric circuits, includes domain information in the learning process, and uses a look-up based on the source address field of a broadcast frame for forwarding the broadcast packet. For the present embodiment, the switching fabric circuits transfer information to one another via the interswitch links. The shared information includes network learning information gleaned from intraswitch transactions. Because the interswitch links are standard LAN segments, shared information is transferred as standard LAN frames in between interswitch transactions by endstations.

The learning process of the present embodiment includes the determination of the domain for each endstation. Thus, each entry of the forwarding tables of the switching fabric circuits include a domain field for indicating the domain of each learned endstation. The domain information is transferred between switching fabric circuits as part of the shared learning process. The recording and transfer of domain information results in the elimination of the need to encapsulate data and the need for proprietary, non-standard interswitch links.

Shared learning and the recordation of domain information allows a switching fabric circuit that receives a broadcast packet to perform an additional look-up based on the source address of the source endstation. Because each entry in the forwarding tables includes domain information, a look-up based on the source address allows the switching fabric circuits to determine the domain of a broadcast packet. Thus, the source address is used to determine the forwarding of a broadcast packet.

It is possible for switching fabric circuits to learn about the locations of endstations quickly without going through an extended learning process. For example, a network management station connected to a LAN segment may download information regarding all endstations of the network and send this information to each of the switching fabric circuits. For such a case, the use of shared learning is not necessarily required. So long as domain information is included in each table entry, the use source look-up may be implemented to provide the extension of domains across an interswitch link.

Figure 5:
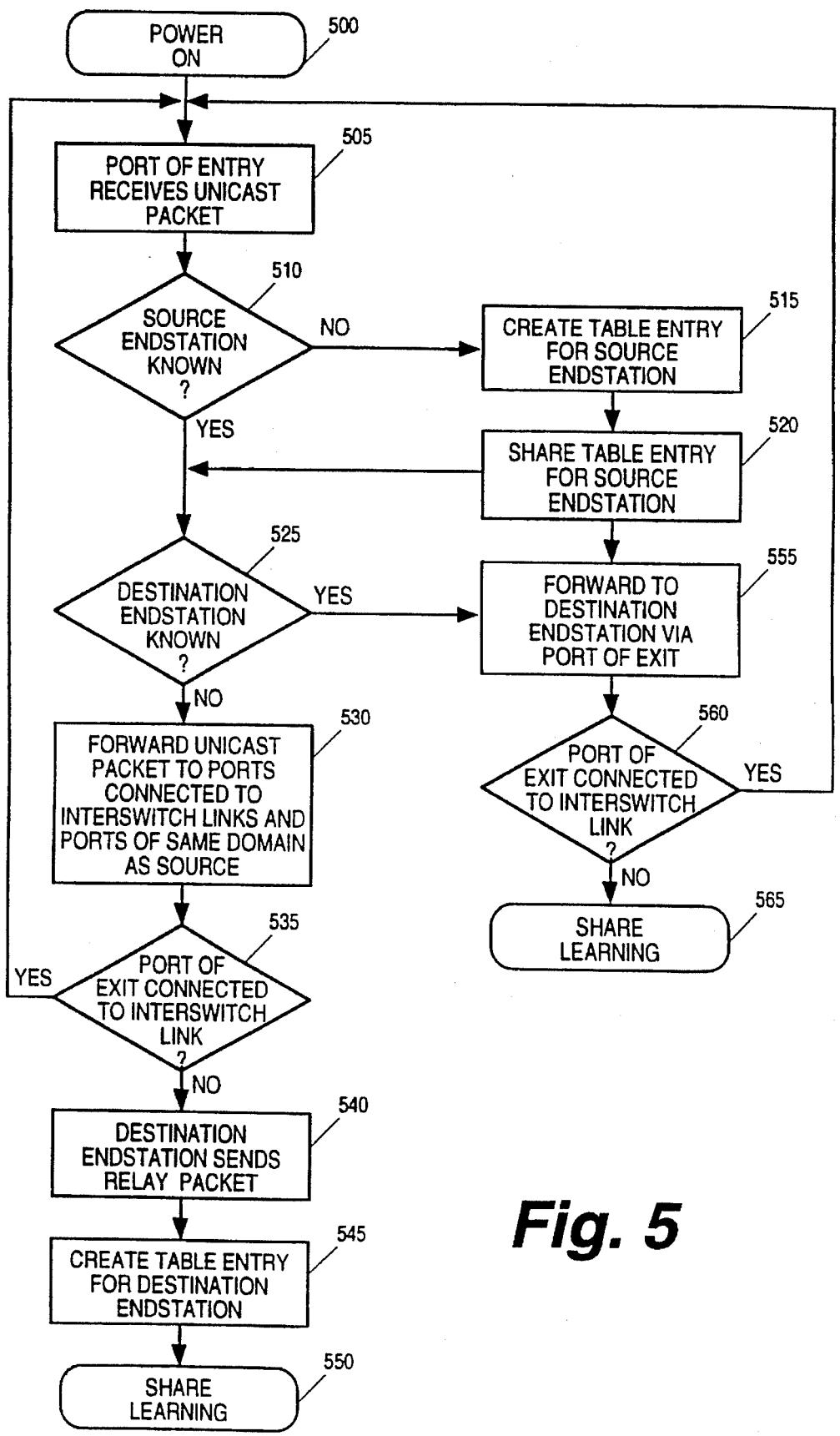
FIG. 5 is a flow chart for processing unicast packets according to one embodiment.

The implementation of shared learning, domain information, and source look-ups will now be discussed with reference to the flow chart of FIG. 5. FIG. 5 is a flow chart illustrating a method for learning when the packet is a unicast packet. When power is first applied to the switching fabric circuits of segmented computer network 400 at step 500, no information regarding the endstations or the other switching fabric circuits is known. Therefore, initially, the forwarding tables of the switching fabric circuits contain no entries regarding endstations. To facilitate the learning process, however, the forwarding tables preferably include entries specifying the addresses and locations of other switching fabric circuits.

After the power is switched on and the switching fabric circuits communicate their presence to one another, endstation SA1 of LAN segment A1 attempts to send a unicast packet to endstation SA5 of LAN segment A3. At step 505, port 1, the port of entry of the unicast packet into the switching fabric circuit A, receives the unicast packet from endstation SA1 via LAN segment A1. The unicast packet includes a destination address field specifying endstation SA5 as the destination of the unicast packet. The unicast packet also includes a source address field specifying endstation SA1 as the source of the unicast packet. At step 510, it is determined whether the source endstation is known. In this case, the source endstation is not known, and switching fabric circuit A creates a table entry for its forwarding table specifying that endstation SA1 is located at port 1 and that endstation SA1 is part of domain VN1 at step 515. This entry is created in response to the contents of the source address field of the unicast packet. At step 520, the table entry for endstation SA1 is shared with the other switching fabric circuits.

At step 525, switching fabric circuit A performs a look-up using the destination address field of the unicast packet. Of course, no destination information is found because no forwarding for the destination endstation has been learned. In such a case, at step 530, switching fabric circuit A forwards the unicast packet to all ports that have been specified as being part of domain VN1, with the exception of port 1, the port of entry. Intraswitch forwarding on the basis the originating domain preferably is performed in response to physical configuration of the switching fabric circuit. No source look-up is required at this stage. Switching fabric circuit A also forwards the unicast packet to all ports that are connected to interswitch links. The manner in which the forwarded unicast packet is handled is determined by whether the port of exit is coupled to a LAN segment or an interswitch link. The path of the flow is shown as being altered at step 535 based on whether the port of exit is coupled to a LAN segment or an interswitch link. Because the forwarding information regarding the source endstation has been shared, the receiving switching fabric circuits have information regarding the domain of the source endstation. The switching fabric circuits may thus appropriately forward the unicast packet to LAN segments of the correct domain.

For port 3, which is connected to LAN segment A3, the unicast packet is successfully forwarded to the endstation SA5. Endstation SA5 sends a reply packet to the switching fabric circuit at step 540. The reply packet includes the source address field specifying endstation SA5. The port of entry for the reply packet is port 3, and, at step 545, the switching fabric circuit A creates an entry in the forwarding table indicating that endstation SA5 is associated with port 3 and is part of domain VN1. The learning regarding endstation SA5 is thereafter shared as required. This is shown at step 550. Learning proceeds in a similar manner until all endstations of the segmented network are known.

Once an entry has been created for an endstation, unicast packets are forwarded to the correct port of exit by performing a look-up based solely on the information contained in the destination address field of the unicast packet. Thus, if the destination endstation is known at step 525, the unicast packet is forwarded at step 555 to the destination endstation via the port of exit specified by the table entry. At step 560, if the port of exit is connected to an interswitch link, the process begins at step 505 for the remote switching fabric circuit. This is because standard LAN packets transmitted from the port of exit or a first switching fabric circuit are received at a port of entry for a second switching fabric circuit. The second switching fabric circuit must determine the final destination of the unicast packet, which may be to a third switching fabric circuit. If the port of exit is not connected to an interswitch link, learning is shared at step 565.

As described above, if the destination endstation is unknown, the switching fabric circuit forwards the unicast packet to all LAN segments of the same domain as the port of entry at step. For segmented computer networks having extended domains, it is possible the destination endstation is local to a remote switching fabric circuit. Therefore, a unicast packet specifying an unknown destination is also forwarded to remote switching fabric circuits via the corresponding interswitch links. The manner in which a switching fabric circuit forwards such a unicast packet is determined by the state of the segmented network upon receipt of the unicast packet.

There are two possible cases. The first case occurs when destination endstation is unknown, the source endstation is known to the switching fabric circuit and the switching fabric circuit has shared information regarding the source endstation with other switching fabric circuits. For the first case, the unicast packet is immediately forwarded. Multicast and broadcast packets are also forwarded under such circumstances.

The second case occurs when both the destination endstation and the source endstation are unknown. If the source endstation is unknown to its local switching fabric circuit, the source endstation cannot be known to remote switching fabric circuits. This is true because information about an endstation is learned only when that endstation attempts to send packets through its local switching fabric circuit. In this case, once the local switching fabric circuit creates an entry in its forwarding table for the source endstation, the local switching fabric circuit sends the forwarding information to remote switching fabric circuits via interswitch links. This process occurs at steps 510, 515 and 520 of FIG. 5. This allows the remote switching fabric circuits to forward the forwarded unicast packet to the appropriate ports.

Therefore, in the example of endstation SA1 transmitting to endstation SA5, switching fabric circuit A forwards its forwarding table information regarding endstation SA1 to switching fabric circuit B via interswitch link AB and to switching fabric circuit C via interswitch link AC. Switching fabric circuit B uses the forwarding information contained in the data field of the forwarding information packet to update its forwarding table. An entry is created specifying that endstation SA1 is located at port 6 and is part of domain VN1. Note that the designation of the port for the source endstation is determined by the local port of entry for switching fabric circuit B, not by the original port of entry, port 1 of switching fabric A. Similarly, switching fabric circuit C creates a table entry indicating that endstation SA1 is located at port 10.

Switching fabric A forwards the unicast packet originally transmitted by endstation SA1 to all ports of domain VN1 and to all interswitch links. Switching fabric circuits B and C have not learned the location of the destination endstation, so each must similarly perform the steps of forwarding the unicast packet to all local LAN segments of domain VN1. If the information regarding the domain of endstation SA1 is not shared, the switching fabric circuits B and C forward the unicast packet to LAN segments of domain VN2, as well.

An interesting case arises when the remote switching fabric circuits to which a forwarded unicast packet are sent are themselves connected to one another via an interswitch link. For example, switching fabric circuits B and C are connected via interswitch link BC. When the destination endstation is unknown, there is the possibility that the same forwarded packet may be sent twice by the two switching fabric circuits. This case can be guarded against by implementing the spanning tree protocol of IEEE standard 802.1(d) or equivalent protocol.

If the destination endstation is endstation SB1 instead of endstation SA5, the flow of FIG. 5 may be slightly different. For such a case, endstation SB1 sends a reply packet to switching fabric circuit B, not switching fabric circuit A, at step 535. Switching fabric circuit B creates a table entry associating endstation SB1 with port 7 and domain VN1. This forwarding information for SB1 may be shared immediately or at the next scheduled exchange of forwarding information. Once shared, switching circuit A will identify endstation SB1 as being associated with port 5 and part of domain VN1.

In addition to sharing forwarding information to determine the location of unknown destination endstation, the switching fabric circuits preferably share information at scheduled intervals as a background task. For example, switching fabric circuits may be programmed to send forwarding information packets once every five minutes. Sharing forwarding information speeds the learning process for each switching fabric circuit and ultimately increases the throughput of the segmented computer network 400 because the possibility that a destination endstation is unknown to a switching fabric circuit is reduced. For example, it is quite possible that a first endstation will act as a source for several packets before it is ever a destination for a packet. Because table entries are created as soon as an unknown endstation is the source of a packet, the table entry for the first endstation can be shared with remote switching fabric circuits before a second remote endstation attempts to send a packet to the first endstation. The location of the first endstation is then known to the remote switching fabric circuit.

Forwarding information may also be shared upon demand of a switching fabric circuit. For example, if a destination endstation address is unknown to the switching fabric circuit, the switching fabric circuit can demand that remote switching fabric circuits share their forwarding information prior to proceeding with the normal steps of determining the location of an unknown destination endstation.

Until this point, the discussion and examples have focused on unicast packets. Multicast and broadcast packets, however, are more interesting cases. The following example is expressly drawn to the case of broadcast packets, but the cases of multicast packets and implied broadcast packets are handled in an equivalent manner. The flow for processing broadcast and multicast packets according to one method is shown in FIG. 6.

For this example, endstation SC4 attempts to send a broadcast packet to all endstations of domain VN2. The port of entry is port 12 of switching fabric circuit C. Steps 600–620 of FIG. 6 are identical to steps 500–520 of FIG. 5. At step 625, a look-up on the destination address field of the received packet reveals that the received packet is a broadcast packet. At step 630, look-up is performed on the source address field of the broadcast packet to determine the domain of the broadcast. Assuming that a table entry exists for endstation SC4, the look-up indicates that endstation SC4 is part of domain VN2. Switching circuit C has no LAN segments other than LAN segment C2 that are part of domain VN2. Therefore, at step 635, switching fabric circuit C forwards the packets to switching fabric circuits A and B via interswitch links AC and BC, respectively.

Figure 6:
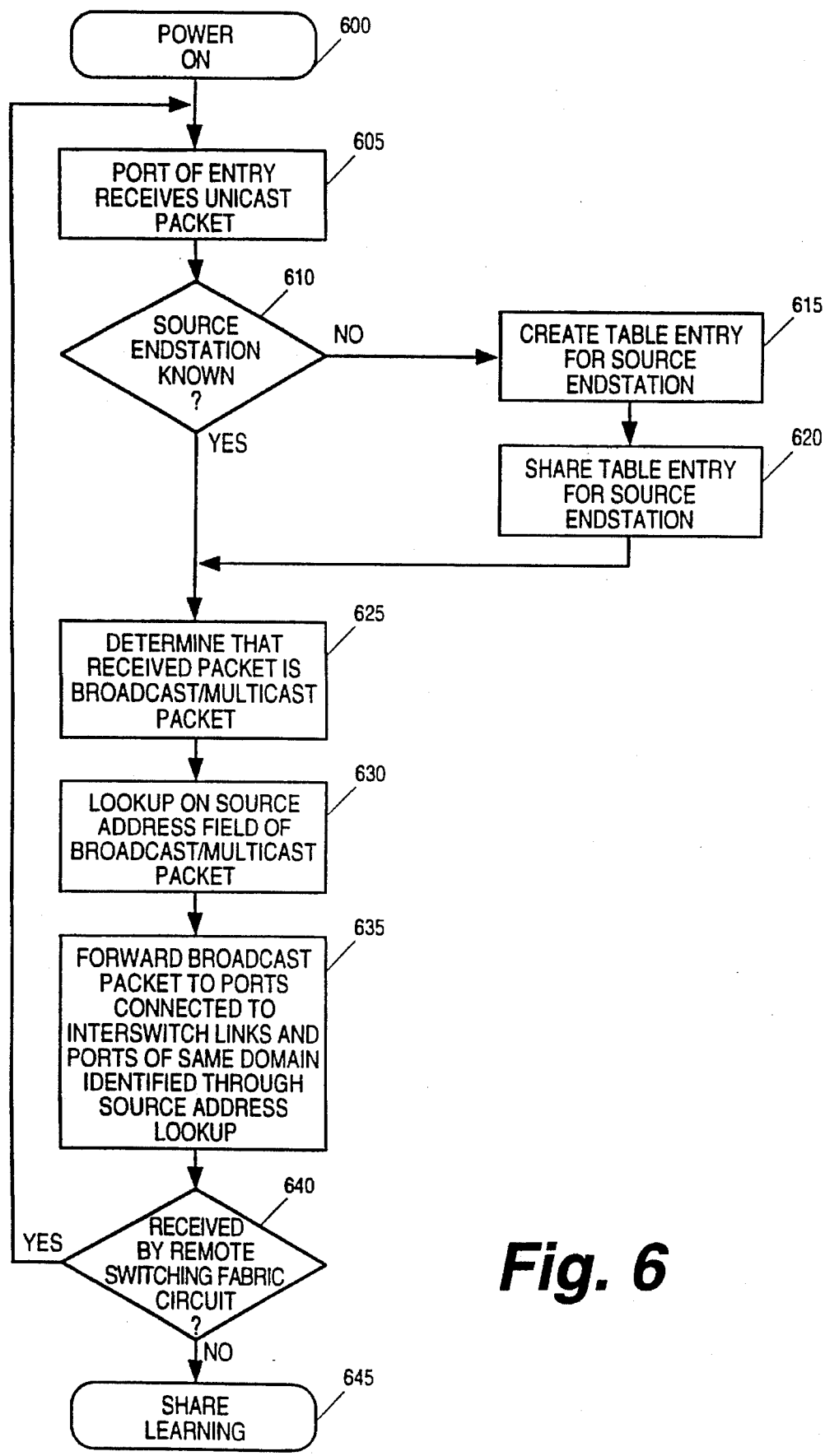
FIG. 6 is a flow chart for processing broadcast and multicast packets according to one embodiment.

The flow of FIG. 6 is determined at step 640 by whether the port of exit to which the broadcast packet is forwarded at step 635 is connected to a LAN segment or an interswitch link. If the port of exit is connected to a LAN segment, the process ends at step 645. If the port of exit is connected to an interswitch link, the flow 10 restarts at step 605 for the remote switching fabric circuit. For example, assuming the source endstation is known, switching fabric circuit A performs a look-up on the destination of the forwarded packet and determines that the forwarded packet is a broadcast packet at step 625. Switching fabric circuit A then performs a look-up on the source address field at step 630 and forwards the broadcast packet to all of its ports that are part of domain VN2 at step 635. The spanning tree protocol described above prevents the broadcast packet from being forwarded again to switching fabric circuit B. If additional switching fabric circuits were included in the segmented computer network 400, it is possible that switching fabric circuit A would forward the broadcast packet to the additional switching fabric circuits at step 635. Switching fabric circuit B performs identical look-up steps and forwards the broadcast packet to all of its ports that are part of domain VN2.

The tasks of shared learning and look-ups are performed by the respective switching fabric circuits A, B and C. The switching fabric circuits may each have a single forwarding table that is maintained by a switching processor, as has been described. An example of such switching fabric circuits includes a system having multiple bridges coupled to a backbone bus that is controlled by a system processor. A preferable switching fabric circuit arrangement is one in which each port of a switching fabric circuit maintains its own forwarding table. A switching processor having the limited duties of managing the learning process and sharing learning is also preferably part of preferred switching fabric circuit arrangement. This type of switching fabric circuit results in significant advantages in throughput over conventional bridging structures.

Figure 7:
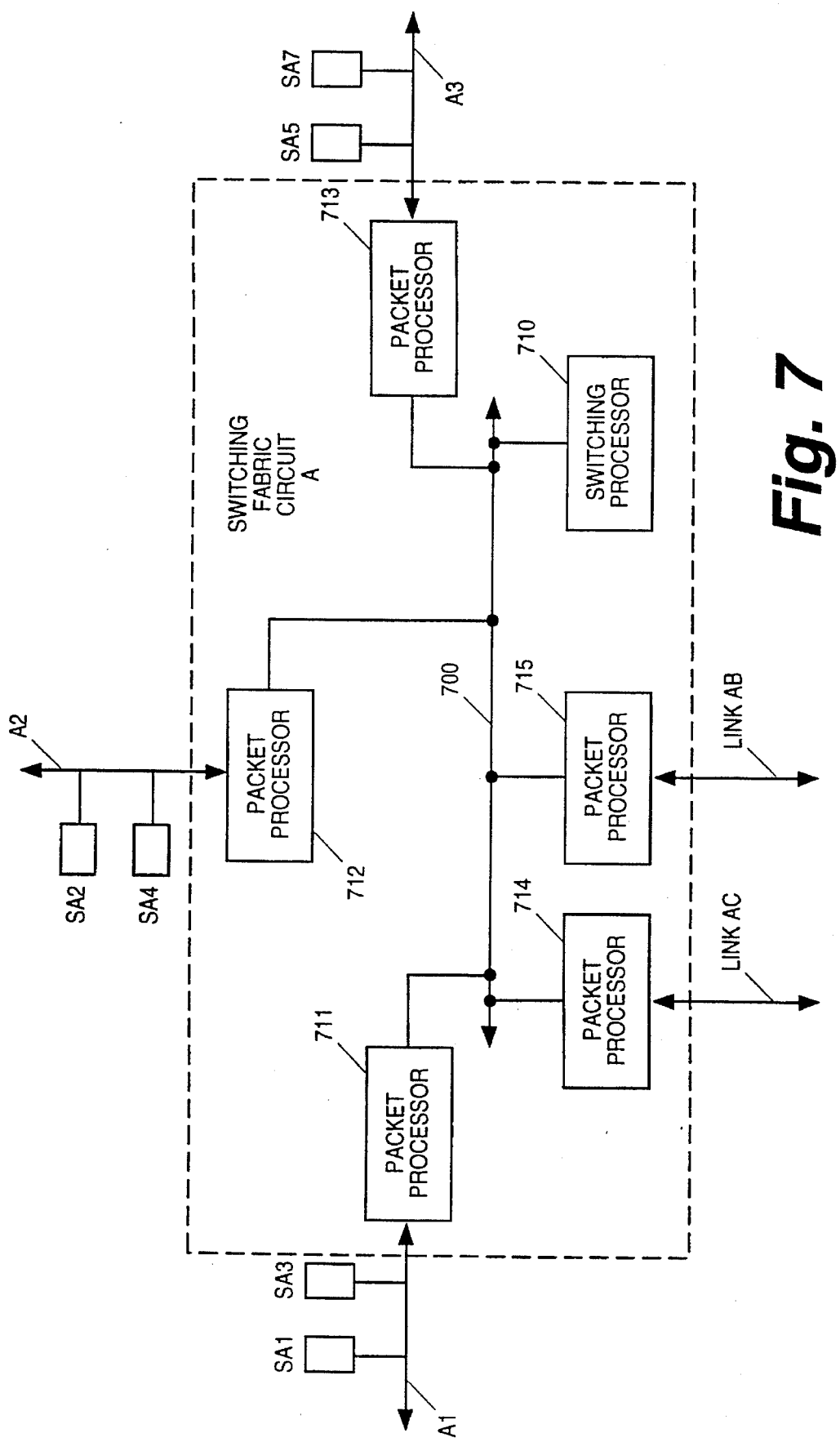
FIG. 7 shows a switching fabric circuit of one embodiment.

FIG. 7 shows a switching fabric circuit of one embodiment in greater detail. Switching fabric circuit A includes bus 700 to which is coupled switching processor 710 and packet processors 711–715. The bus 700 is a partially asynchronous time division multiplexed bus that supports both synchronous and asynchronous transfers of system packets. The bus 700 allows the switching fabric circuit A to support heterogeneous LAN segments of various bandwidths. For example, LAN segment A1 can be a 10 Mb/s segment, LAN segment A2 can be a 100 Mb/s segment, and LAN segment can be a 155 Mb/s LAN segment. Synchronous transfers are reserved for transfers between packet processors coupled to 10 Mb/s LAN segments. Bandwidth for the bus may be dynamically allocated such that idle time for the switching fabric circuit A is reduced. For purposes of simplifying discussion, each LAN segment will be assumed to be a 10 Mb/s segment.

A packet processor is coupled to each of the LAN segments and to each of the interswitch links. Packet processor 711 is connected to LAN segment A1. Packet processor 712 is connected to LAN segment A2. Packet processor 713 is connected to LAN segment A3. Link AC is connected to packet processor 714, and link AB is connected to packet processor 715. Each packet processor maintains a local forwarding table for its LAN segment. Additionally, the switching processor 710 maintains a master forwarding table for the entire switching fabric circuit A.

Upon power up of switching circuit A, learning is initiated. When switching circuit A is first powered on, no forwarding information for endstations is included in any of packet processors 711–715. All local forwarding tables of the packet processors 711–715 are initialized by switching processor 710 to be invalid. The forwarding tables are built up, entry by entry, with subsequent transmissions and shared learning. The process of learning is that described above with respect to FIGS. 4 and 5.

Intraswitch communications between packet processors for the respective LAN segments are done using system packets. System packets are modified versions of the LAN packets received and transmitted over the various LAN segments. When a LAN packet is received from a LAN segment by a packet processor of the port of entry, the port of entry packet processor creates an entry for the source endstation based on the source address field of the LAN packet. The port of entry packet processor also creates a system header which is prepended to the LAN packet to create the system packet. The system packet is transmitted via the bus 700 to port, or ports, of exit. When a system packet is received by a port of exit, the port of exit packet processor strips the system header from the system packet to produce a standard LAN packet for forwarding on the connected LAN segment.

Figure 8:
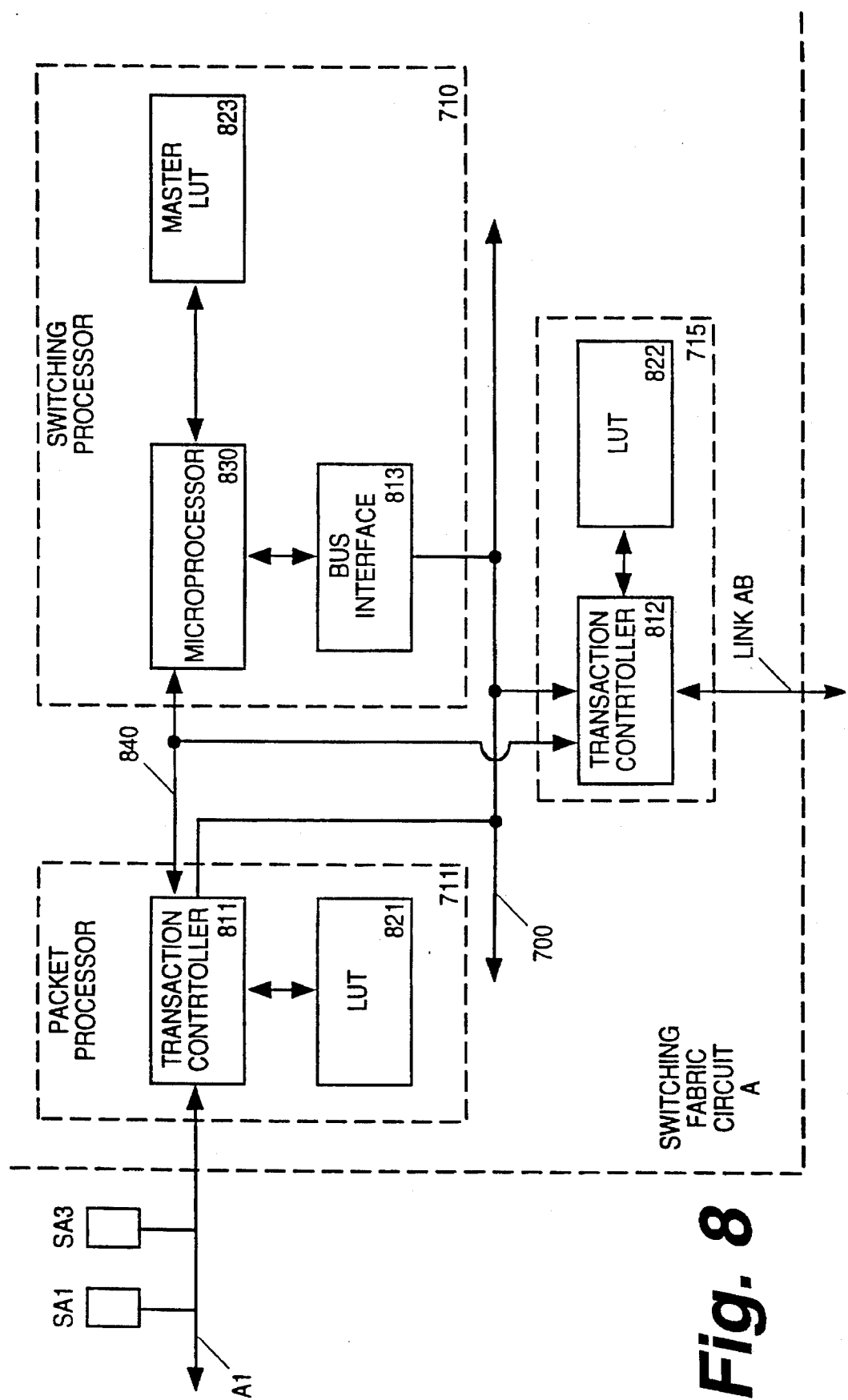
FIG. 8 shows the switching fabric circuit in greater detail.

FIG. 8 shows switching fabric circuit A in greater detail. Packet processor 711 is shown as including transaction controller 811 and Random Access Memory ("RAM") look-up table ("LUT") 821. Similarly, packet processor 714 includes transaction controller 812 and LUT 822. Switching processor 710 is shown as including bus interface 813, master LUT 823 and microprocessor 830. Each LUT is used as a forwarding table for storing forwarding information. Each of the transaction controllers 811 and 812 and the bus interface 813 are coupled to each other via the bus 700. In addition to this interconnection between the packet processors and the switching processor 710, there is also shown processor bus 840. Transaction controllers 811 and 812 and bus interface 813 are equivalent circuitry. Each of the transaction controllers 811 and 812 and bus interface 813 include circuitry necessary to transmit and receive system packets. Each of the transaction controllers 811 and 812 and bus interface 813 also include circuitry necessary to remove system headers from system packets and to process the resulting standard LAN packets. Therefore, each of the transaction controllers 811 and 812 and bus interface 813 is capable of creating and appending system headers to the beginning of LAN packets to create system packets, and each is capable of stripping system headers from the system packets. The LUTs 821–823 each maintain forwarding table information regarding endstations of the segmented network. The transaction controller 811 and 812 and bus interface 813 use information contained in the look-up tables 821–823 to create and process system headers for system packets.

The processor bus 840 is provided to allow microprocessor 830 to update the look-up tables of the various ports of the switching fabric circuit A. The processor bus 840 is also used by the microprocessor during intraswitch learning. Master LUT 823 includes all of the entries for all of the ports of switching fabric circuit A. LUT 821 contains entries only for those endstations known to be in the same domain as LAN segment A1. LUT 822 includes entries for all the endstations coupled to switching fabric circuit A and to switching fabric circuit B.

Figure 9:
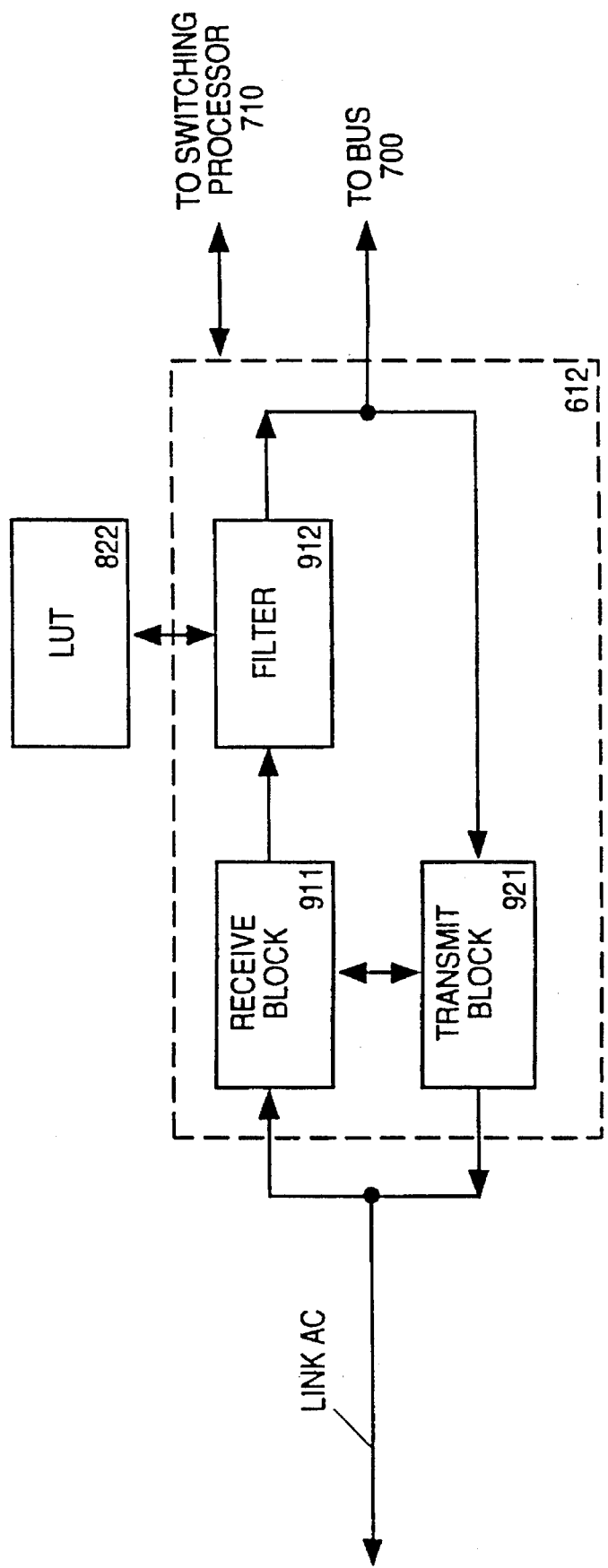
FIG. 9 shows a transaction controller of a switching fabric circuit.

FIG. 9 shows the transaction controller 812 of port 5 in greater detail. Transaction controller, like all transaction controllers of each switching fabric circuit, includes a receive block 911, a filter 912, and a transmit block 921. For this embodiment, the transmit block 911 contains circuitry compliant with Ethernet standard 802.3 MAC requirements for receiving LAN packets. The filter 912 is for creating and prepending the system header in response to the result of look-up table 822 to create a system packet. The filter 912 transmits the system packet to bus 700 and the designated ports or the switching processor 710. The transmit block 921 is compliant with IEEE 802.3MAC requirements for transmitting LAN packets.

The content of forwarding tables and the process of intraswitch transactions will now be discussed. Table 1 is a sample forwarding table including relevant entries for port 1 to which LAN segment A1 is coupled. The LUT 821 includes entries for all those endstations coupled to LAN segment A1 and endstations coupled to other known LAN segments having the same domain. Each entry is defined by the endstation address, which is, in fact, an IEEE standard 48-bit memory access controller (MAC) address. Each entry also includes information that indicates whether the end station is local to that port or resides in a remote port. In this example, a logic 0 indicates that the endstation resides in a local LAN segment and a logic 1 indicates that the endstation resides in a remote LAN segment. If the endstation resides in a remote LAN segment, the port to which system packets are to be forwarded is also stored. Finally, a domain identification field is also maintained. Much of this information may be stored as a "port of exit mask," which is discussed in more detail below.

TABLE 1

PORT 1 FORWARDING TABLE

| ENDSTATION | LOCAL/REMOTE | PORT | DOMAIN |
| --- | --- | --- | --- |
| SA1 | 0 | X | VN1 |
| SA3 | 0 | X | VN1 |
| SA5 | 1 | 3 | VN1 |
| SA7 | 1 | 3 | VN1 |
| SB1 | 1 | 5 | VN1 |
| SB3 | 1 | 5 | VN1 |
| SC1 | 1 | 4 | VN1 |
| SC3 | 1 | 4 | VN1 |

As shown in Table 1 endstations SA1 and SA3 are local stations in domain VN1. Endstations SA5 and SA7 are remote endstations. Similarly endstations SB1, SB3, SC1 and SC3 are also remote endstations.

When a standard LAN packet is received indicating any one of the remote endstations for an endstation-to-endstation transaction (i.e., a unicast packet), the transaction controller 811 will treat the LAN packet in equivalent manner regardless of the fact that some endstations may reside in a remote switching fabric circuit. The transaction controller will perform a look-up, create a system header based on the look-up, and append that system header to the beginning of the standard LAN packet to create a system packet. The system packet is forwarded on the bus 700 to the remote port indicated by the look-up. When received by the remote port, the system header is stripped from the system packet and the resulting standard LAN packet is forwarded over the LAN segment connected to the remote port. This is true whether the LAN segment is an interswitch link or a LAN segment that is coupled to multiple endstations.

TABLE 2

PORT 5 FORWARDING TABLE

| ENDSTATION | LOCAL/REMOTE | PORT | DOMAIN |
| --- | --- | --- | --- |
| SA1 | 1 | 1 | VN1 |
| SA3 | 1 | 1 | VN1 |
| SA2 | 1 | 2 | VN2 |
| SA4 | 1 | 2 | VN2 |
| SA5 | 1 | 3 | VN1 |
| SA7 | 1 | 3 | VN1 |
| SB1 | 0 | X | VN1 |
| SB3 | 0 | X | VN1 |
| SB2 | 0 | X | VN2 |
| SB4 | 0 | X | VN2 |

Table 2 shows sample table entries for the LUT 822 coupled to port 5 of switching fabric circuit A. As shown, endstations SB1–SB4 are considered by LUT 822 to be local to port 5. LUT 822 maintains entries for endstations that are part of domain VN1 and endstations that are part of domain VN2. When a broadcast packet is received by transaction controller 812 from switching fabric B via interswitch link AB, the source address look-up will identify one of the endstations SB1–SB4 to be the originating endstation of the broadcast packet. By comparing the domain information of the source endstation, transaction controller 812 can forward the broadcast packet to the appropriate ports of switching fabric circuit A. For example, if a LAN broadcast packet is received by transaction controller 812, and a look-up of the source address reveals that endstation SB1 is the source endstation, a system header will be created by transaction controller 812 indicating that the system packet is to be sent to ports 1 and 3, which are also part of domain VN1.

TABLE 3

MASTER FORWARDING TABLE

| ENDSTATION | LOCAL/REMOTE | PORT | DOMAIN |
| --- | --- | --- | --- |
| SA1 | X | 1 | VN1 |
| SA3 | X | 1 | VN1 |
| SA5 | X | 3 | VN1 |
| SA7 | X | 3 | VN1 |
| SB1 | X | 5 | VN1 |
| SB3 | X | 5 | VN1 |
| SC1 | X | 4 | VN1 |
| SC3 | X | 4 | VN1 |
| SA2 | X | 2 | VN2 |
| SA4 | X | 2 | VN2 |
| SB2 | X | 5 | VN2 |
| SB4 | X | 5 | VN2 |
| SC2 | X | 4 | VN2 |
| SC4 | X | 4 | VN2 |

Table 3 shows sample entries of master look-up table 823. Master look-up table 823 contains entries for all known endstations in the segmented network. Because there are no LAN segments coupled directly to the switching processor 710, the local-remote field of look-up table is irrelevant. Master look-up table 823 does include a port designation and domain information for every endstation. It is the information stored in the master look-up table 823 that is shared during interswitch learning transactions.

When an interswitch learning packet is received by one of the interswitch links AB or AC, the corresponding transaction controller forwards the interswitch learning packet to the microprocessor 830 in a system packet having a system header specifying the microprocessor as the destination. The bus interface 813 strips the system header from the system packet to produce the system interswitch learning packet. Microprocessor 830 processes the learning packet and updates the master look-up table 823 with information contained in the interswitch learning packet. After the master look-up table 823 has been updated, microprocessor 833 uses processor bus 840 to update the local port look-up tables of the various packet processors. Updating of local look-up tables is done in a selective fashion to reduce the need for excess memory components. For example the entries of look-up tables 821 will be updated to include endstations that are coupled to a remote port and whose domain is VN1. Local port endstations will not be updated after shared learning.

Figure 10:
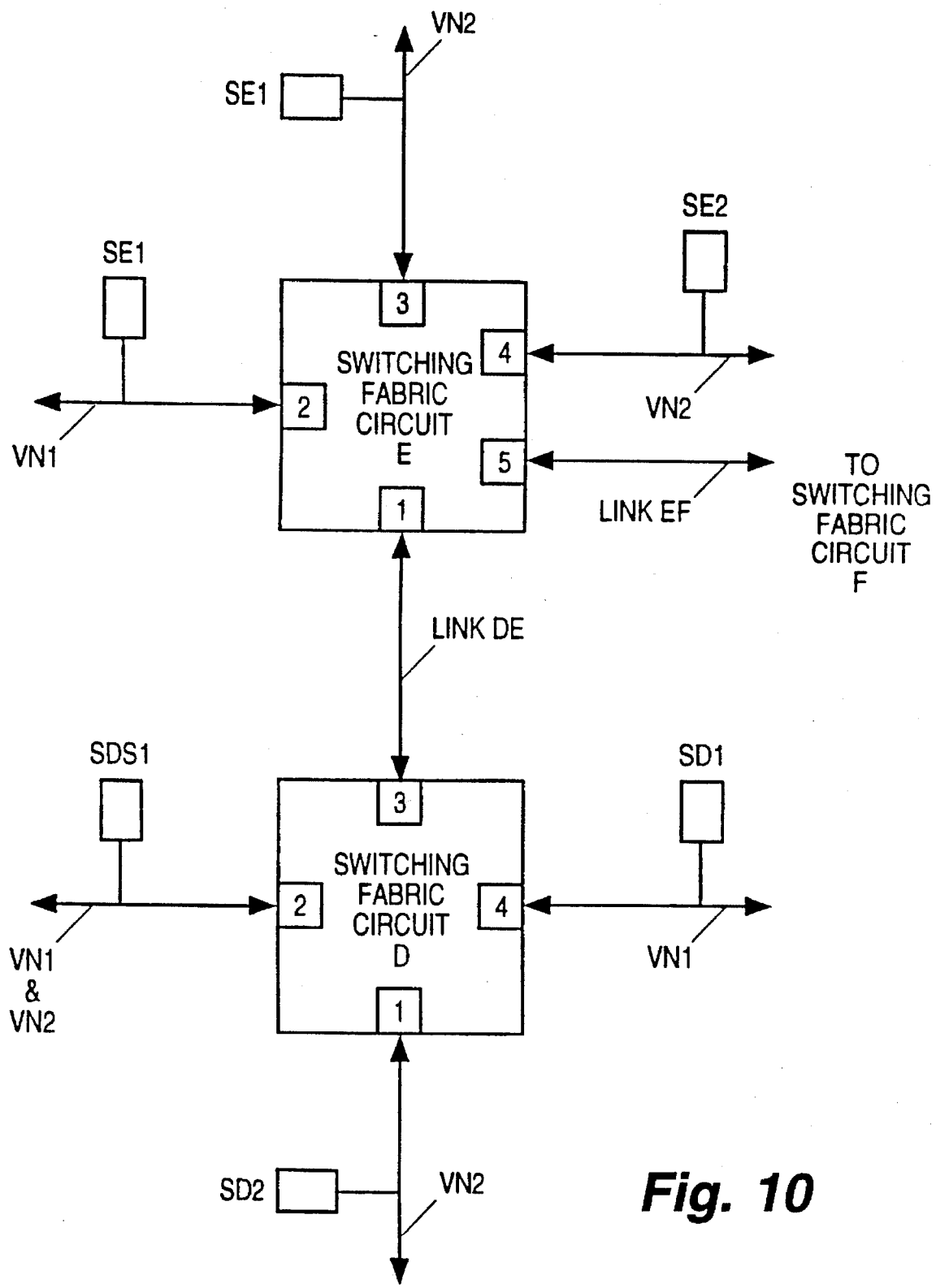
FIG. 10 shows a segmented network that includes a superport.

FIG. 10 shows a segmented network having a superport configured to be part of more than one domain. Any port of a switching fabric circuit can be configured to be superport, and any endstation (ES) connected to the LAN segment of a superport is part of more than one domain. For this example, the segmented network includes switching fabric circuits D and E that include a total of nine ports, only one of which is configured as a superport. Each of the ports has a packet processor associated with it, and forwarding tables are defined locally for each port. Switching fabric circuits D and E are connected to one another via interswitch link DE. The ports of switching fabric circuits D and E are shown as being locally defined such that each switching fabric circuit includes a port 1, a port 2, et cetera.

For switching fabric circuit D, port 1 is specified as being in domain VN2, and endstation SD2 is local to port 1. Port 2 is specified as a superport and supports traffic for both domains VN1 and VN2. Endstation SDS1 is local to port 2, and may be a fileserver that is shared by both domains. Port 3 is connected to interswitch link DE. Port 4 is specified as being in domain VN1, and endstation SD1 is local to port 4.

For switching fabric circuit E, port 1 is connected to interswitch link DE, and port 5 is connected to interswitch link EF. Endstation SE2 is local to port 4 and is part of domain VN2. Wherein port 2 is specified as being in domain VN1 and port 3 is specified as being in VN2, each of the ports has a local endstation SE1. This situation is illustrative of a system administrator's ability to locally define the MAC addresses of endstations, as specified by the IEEE 802 standard. A single bit of a MAC address is a local/global bit that specifies whether the MAC address is local or global. Wherein local MAC addresses are not assured of being globally unique, local MAC addresses should be specified such that each address within a domain remains unique within that domain.

The use of local MAC addresses complicates the operation of the segmented network. For example, if a unicast packet that specifies endstation SD1 as the source endstation and endstation SE1 as the destination endstation is received by port 1 of switching fabric circuit E, a simple destination look-up does not guarantee that the unicast packet is forwarded only to the correct domain. The operation of the segmented network can be further complicated by multicast addresses that specify less than all of the endstations of a particular domain. To address these and other problems, a "port of exit mask" for each endstation known to a port may be maintained as part of the forwarding table for that port. The port of exit mask for a particular endstation may vary from port to port. To determine the final port of exit for a received LAN packet, the port of entry may compare the domain information of the source endstation to the domain information of the destination endstation. Such a comparison may be done, for example, by performing a logical AND operation using the port of exit masks for the destination endstation and the source endstation as operands.

TABLE 4

FORWARDING TABLE FOR PORT 1 OF SWITCHING FABRIC CIRCUIT E

| ENDSTATION | DOMAIN | PORTS | PORT OF EXIT MASK | | | | |
| --- | --- | --- | --- | --- | --- | --- | --- |
| | | | 5 | 4 | 3 | 2 | 1 |
| SDS1 | VN1, VN2 | | 1 | 1 | 1 | 1 | 0 |
| SD1 | VN1 | | 1 | 0 | 0 | 1 | 0 |
| SD2 | VN2 | | 1 | 1 | 1 | 0 | 0 |
| SE1 | VN1, VN2 | | 0 | 0 | 1 | 1 | 0 |
| SE2 | VN2 | | 0 | 1 | 0 | 0 | 0 |
| MC1 | — | | 1 | 1 | 0 | 1 | 0 |
| MC2 | — | | 1 | 1 | 0 | 0 | 0 |

Table 4 shows a forwarding table for port 1 of switching fabric circuit E, which is coupled to interswitch link DE. The forwarding table includes entries for local endstations SD1, SD2, and SDS1, remote endstations SE1 and SE2, and multicast addresses MC1 and MC2. Forwarding tables typically include separate table entries for each multicast address. Table 4 uses port of exit masks to express port information. Each of the table entries for the forwarding table of Table 4 also includes a local/remote field, which is not shown. As shown, a port of exit mask is a field of binary bits, wherein each bit corresponds to one of the ports for the interswitch link. One mask bit is provided for each port of the switching fabric circuit. Because interswitch link E has five ports, the port of exit mask for each table entry includes five bits, wherein the least significant bit corresponds to port 1 and the most significant bit corresponds to port 5. The significance of the information contained in the port of exit mask is determined by whether the endstation is local or remote to the port.

For packets that specify a remote endstation as a destination, the port of exit mask is used by the port of entry to determine the port or ports of exit of the system packet. For example, a unicast packet specifying endstation SE2 as the destination endstation and endstation SD2 as the source endstation is received by port 1 of switching fabric circuit E. The port of exit mask for destination endstation SE2 specifies port 4 as being the port of exit. The packet processor of port 1 creates a system header specifying port 4 as the port of exit for the system packet. This may be done by simply including the port of exit mask in the system header.

Ports process packets received from a local endstation that specify another local endstation as a destination only to determine whether the source of the packet is known. Further processing is unnecessary as both the source and destination endstations are connected to the same LAN segment. Also, ports of exit do not perform any further look-ups once a system packet is received from the port of entry. Therefore, the port of exit masks for endstations that are local to a port are used only for look-ups of the source address field as described above. The port of exit masks for local endstations are, in fact, domain masks that specify ports of the same domain as the source endstation.

For switching fabric circuits that include only one forwarding table that is shared by all ports, each table entry would include both the source and destination port of exit masks. The correct port of exit mask would be accessed based on the particular situation. Alternatively, each endstation may have two table entries, including (1) a source table entry that is accessed when the endstation is the source of a packet and (2) a destination table entry that is accessed when the endstation is the destination of a packet.

The port of exit mask is a useful and simple mechanism with which to manage information about the location and domain of endstations. Port of exit masks may be advantageously used even when local MAC addresses and other difficulties are not present in the segmented network. For such a case, the simple look-ups described above are used. The port of exit mask is especially useful, however, when local MAC addresses are defined by the system administrator. For such a case, the additional step of performing a logical AND operation using the port of exit masks of the source and destination endstations as operands is performed. This additional step is useful in many situations and may be performed for all unicast, multicast, and broadcast packets. Typically, however, the additional step of performing a logical AND operation is selectively applied in response to the look-up of the destination address. For example, each table entry for destination endstations can include an indicator bit for indicating whether the additional step is to be performed. The switching processor for each switching fabric circuit creates the port of exit masks and determines whether the indicator bit for a particular table entry is set.

The "ANDing" of the source and destination port of exit masks may best be understood with an example. Port 1 of switching fabric circuit E receives a broadcast packet from endstation SD1. The port of exit mask for broadcast packets includes all logic 1's by default. The default mask is "ANDed" with the port of exit mask for endstation SD1, and the final port of exit mask for the system packet specifies ports 2 and 5 as port of exit. If the source endstation is endstation SDS1, the ports of exit are ports 2–5. Thus, the port of exit for a broadcast packet is the port of exit of the source endstation, and the final port of exit mask can be determined equivalently by simply performing the source look-up.

A more interesting example occurs when endstation SD2 attempts to send a unicast packet to endstation SE1. Endstation SD2 is of domain VN2 and, by definition, is attempting to communicate with the endstation SE1 that is coupled to port 3 of switching fabric circuit E. Port 1 of switching fabric circuit E receives the packet and performs a destination look-up and a source look-up. The destination look-up provides the port of exit mask "00110". Sending the unicast packet to the ports indicated by the destination port of exit mask would result in the unicast packet being sent to port 2, causing the isolation of virtual networks VN1 and VN2 to be destroyed. Performing a source look-up and "ANDing" the source and destination port of exit masks reduces the possibility of this undesirable result. The source look-up provides the port of exit mask "11100". "ANDing" the two port of exit masks yields a final port of exit mask "00100", which correctly specifies port 3 as the port of exit while excluding port 4.

A similar example occurs when endstation SD2 is the source of a multicast packet having a destination address of MC2. Multicast address MC2 has a port of exit mask "11000" that specifies less than all of the ports of domain VN2. For such a case, performing only a source address look-up yields a port of exit mask "11100" that would cause the multicast packet to be incorrectly forwarded to port 3. To avoid this situation, the port of exit masks of the source and destination endstations are "ANDed" to yield the port of exit mask "11000", which causes the packet processor of port 1 to correctly forward the system packet to ports 4 and 5, and not to port 3.

Figure 11:
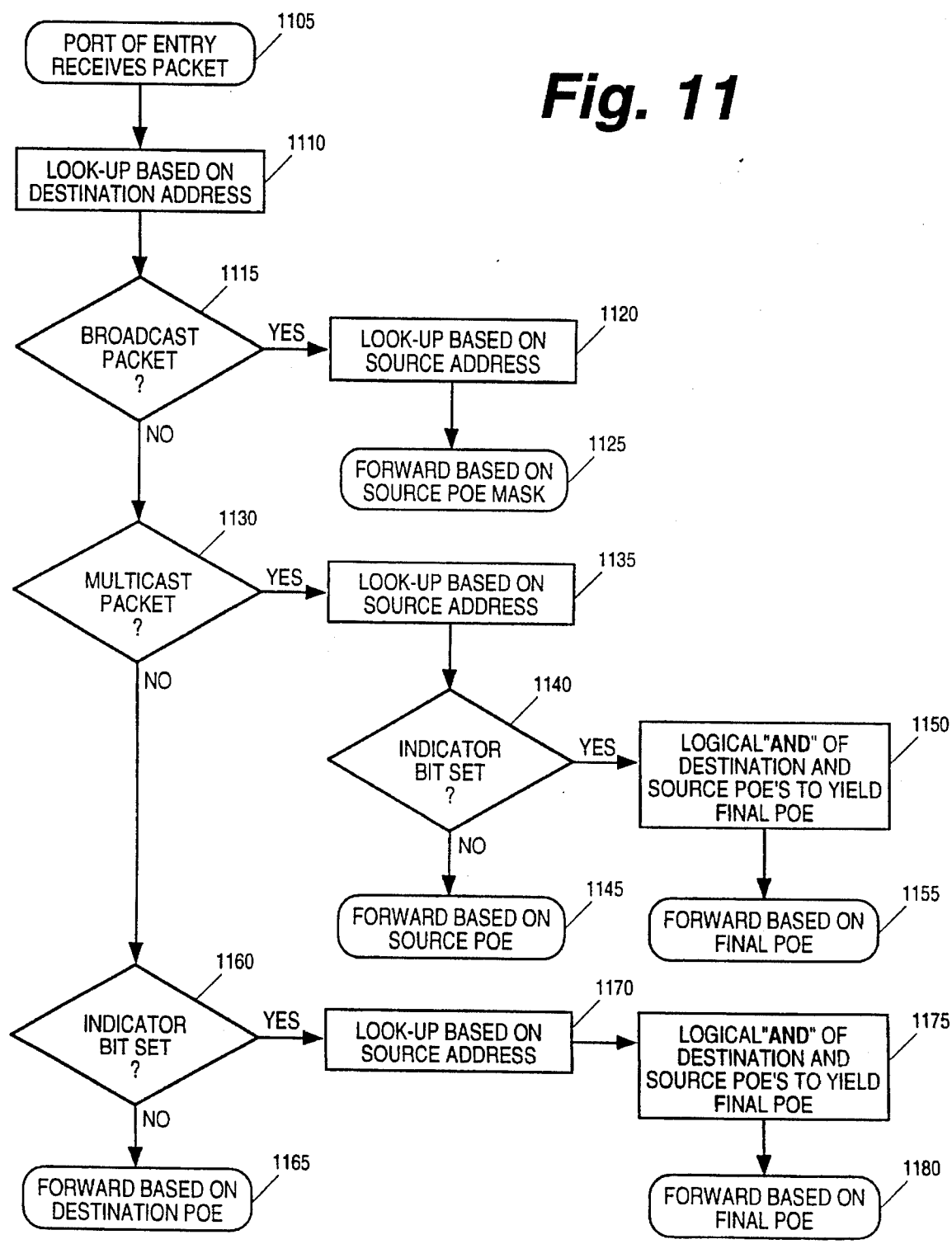
FIG. 11 is a flow chart for processing packets.

FIG. 11 is a flow chart of a method that includes the step of performing a logical AND operation using the source and destination port of exit masks as operands. The port of entry receives a packet at step 1105. At step 1110, the packet processor of the port of entry performs a look-up based on the destination address of the packet. If the look-up reveals that the packet is a broadcast packet at step 1115, the packet processor of the port of entry performs a look-up based on the source address at step 1120. The broadcast packet is forwarded to the appropriate ports of exit based on the source port of exit ("POE") mask at step 1125.

If the packet is not a broadcast packet, it is determined whether the packet is a multicast packet at step 1130. If the packet is a multicast packet, a look-up based on the source address of the multicast packet is performed at step 1135. At step 1140, the packet processor of the port of entry determines whether the indicator bit of the destination endstation's table entry is set. If the indicator bit is not set, the multicast packet is forwarded based on the source port of exit mask at step 1145. If the indicator bit is set, the packet processor performs a logical AND operation using the source and destination port of exit masks as operands to yield a final port of exit mask at step 1150. The multicast packet is forwarded based on the final port of exit mask at step 1155.

If the packet is neither a multicast nor a broadcast packet, the packet is a unicast packet. At step 1160, it is determined whether the indicator bit of the table entry for the destination endstation is set. If not, the unicast packet is forwarded based on the destination port of exit mask at step 1165. If the indicator bit is set, the packet processor performs a look-up based on the source address at step 1170 and performs the logical AND operation using the source and destination port of exit masks as operands at step 1175. The unicast packet is forwarded based on the final port of exit mask at step 1180.

Figures 2, 3:
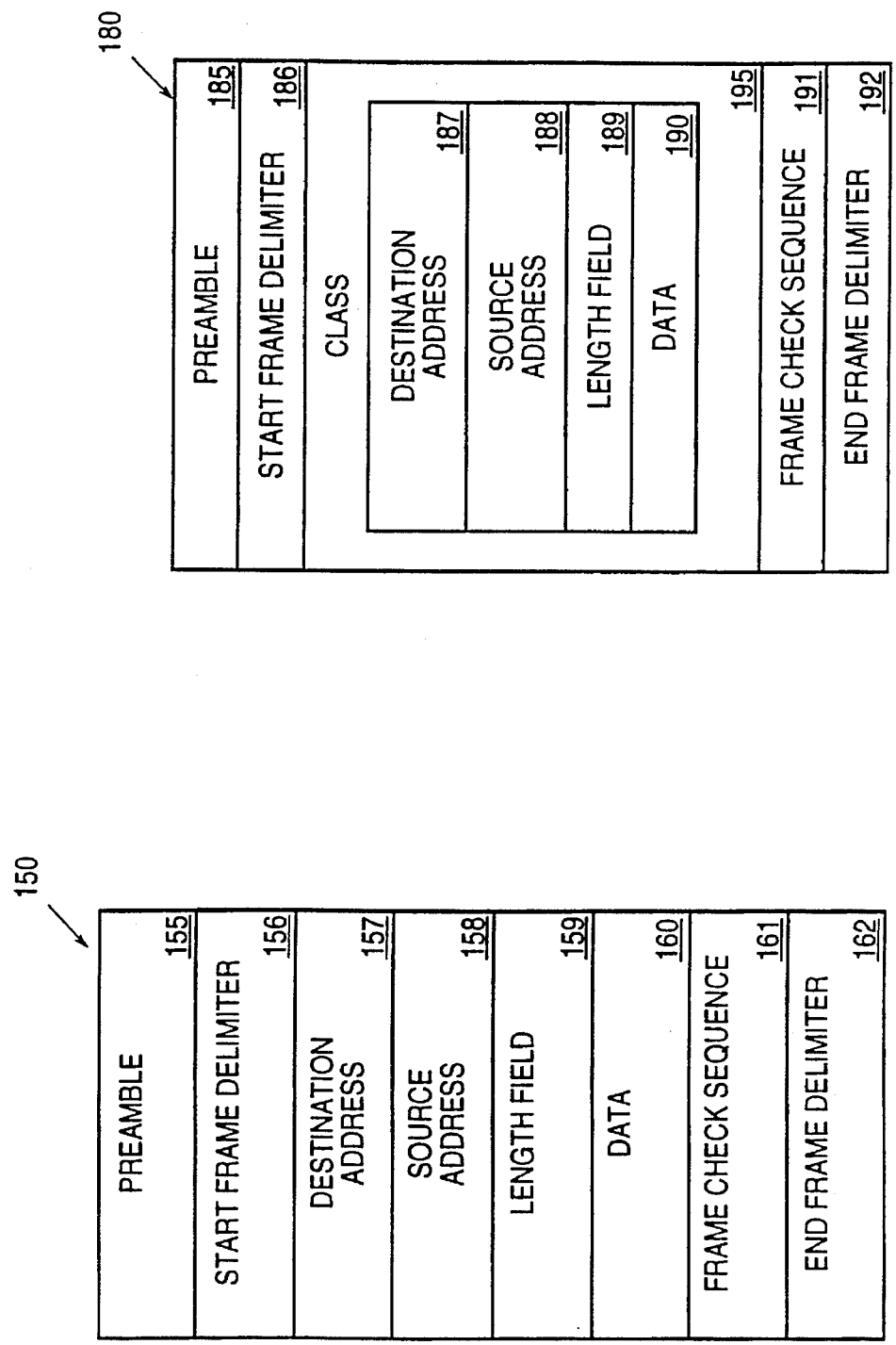
FIG. 2 shows a standard local area network frame according to IEEE standard 802.
FIG. 3 shows encapsulation of a standard local area network frame according to a prior art technique.

The additional step of performing the logical AND operation is also useful for further enhancing the forwarding of unicast packets. It is possible that a particular switching fabric circuit may have more than one path over which to send a LAN packet to a remote endstation. For example, returning to FIG. 3, endstation SC1 has two paths to endstation SB1, including 1) link AC to link AB, and 2) link BC. According to prior art protocols such as the IEEE 802 standard, however, only one path can be specified to prevent the forwarding of duplicate packets to the destination endstation.

For some cases, it is desirable to be able to intelligently select the path to the remote endstation. For example, since the latencies for each path to the remote endstation may differ, when sending high priority information to the remote endstation, it is desirable to select the path having the smallest latency. Furthermore, for cases where the use of the interswitch links is metered, i.e. when the user pays the owner of an interswitch link on a per-packet or per-bit basis, it is desirable to select the path having the lowest cost. Prior methods that provide intelligent selection of paths do exist, but for high-speed applications requiring a fast path selection these prior methods can prove cost-prohibitive. For example, one prior intelligent selection method requires the use of large look-up tables to store pattern information that software uses to make the path selection.

The combination of the source look-up and "ANDing" of port of entry masks provides a convenient and cost-effective mechanism for intelligently selecting the best path to a destination endstation based on the identity of the source endstation. To intelligently select a path using the source look-up and AND operation as described above, the destination port of exit mask for the destination endstation specifies as many ports as there are paths and the indicator bit of the table entry is set to indicate that a source look-up should be performed. In response to the indicator bit being set, the source look-up is performed to retrieve the source port of exit mask. The source port of exit mask specifies only one of the possible paths to the destination endstation. A logical AND operation is performed using the source port of exit mask and the destination port of exit masks as operands. Thus, the selection of paths is determined by the source port of exit mask, and each source endstations having the same domain as the destination endstation can have a source port of exit mask specifying any one of the possible paths to the destination endstation. This diversity of path selection is provided at little added cost as the source and destination information must already be gathered and recorded for the learning process.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than restrictive sense.

What is claimed is:

1. In a segmented computer network having a first domain and a second domain, a method comprising the steps of:

creating a first table entry for a first endstation in a first forwarding table of a first switching fabric circuit, the first table entry including domain information specifying that the first endstation is in the first domain and port information specifying that the first endstation is coupled to a first port;

receiving a packet having the first endstation as a source by the first port of the first switching fabric circuit;

determining a destination for the packet;

forwarding the packet to a second endstation of the first domain if the packet specifies the second endstation as the destination;

determining the domain information of the source if the destination for the packet specifies more than one endstation; and forwarding the packet to endstations of the first domain as specified by the domain information of the source.

2. The method of claim 1, wherein the step of creating the first table entry comprises the steps of:

creating a second table entry for the first endstation in a second forwarding table of a second switching fabric circuit, the second table entry including domain information specifying that the first endstation is in the first domain and port information specifying that the first endstation is coupled to a second port;

sharing the second table entry with the first switching fabric circuit via an interswitch link coupled between the second switching fabric circuit and the first port of the first switching fabric circuit; and updating the first forwarding table to include the first table entry.

3. The method of claim 2, wherein the step of sharing the second table entry comprises the steps of:

creating a packet of forwarding information by a first switching processor of the second switching fabric circuit, the packet of forwarding information including table entries of the second forwarding table; and forwarding the packet of forwarding information to a second switching processor of the first switching fabric circuit via the interswitch link.

4. The method of claim 2, wherein the interswitch link is a standard local area network (LAN) segment, the step of sharing the second table entry comprising the step of:

sending a standard LAN packet to the first port of the first switching fabric circuit via the interswitch link.

5. The method of claim 1, wherein the first port is in the first and second domains.

6. The method of claim 1, wherein the domain information and the port information of the first endstation is included in a first port of exit mask.

7. The method of claim 1, wherein the method further comprises the steps of:

determining the domain information of the source if the packet specifies an unknown destination; and forwarding the packet to endstations of the first domain as specified by the domain information of the source.

8. The method of claim 1, wherein the step of creating the first table entry in the first forwarding table comprises the steps of:

receiving forwarding information from a network management endstation coupled to the segmented network, the forwarding information including domain information specifying that the first endstation is in the first domain and port information specifying that the first endstation is coupled to the first port; and updating the first forwarding table to include the forwarding information.

9. In a segmented computer network having a first domain and a second domain, a method comprising the steps of:

receiving a broadcast packet by a first port of a first switching fabric circuit from a first local area network (LAN) segment that operates according to a LAN standard protocol;

forwarding the broadcast packet to a second switching fabric circuit via an interswitch link by the first switching fabric circuit, wherein the interswitch link operates according to the LAN standard protocol;

receiving the broadcast packet by the second switching fabric circuit;

determining domain information of the broadcast packet by the second switching fabric circuit performing a look-up of a source address of the broadcast packet;

forwarding the broadcast packet to ports of the second switching fabric circuit by the second switching fabric circuit in response to the domain information such that the broadcast packet is forwarded to ports of the first domain if the domain information indicates that the source address of the broadcast packet is of the first domain and such that the broadcast packet is forwarded to ports of the second domain if the domain information indicates that the source address of the broadcast packet is of the second domain.

10. The method of claim 9, wherein the source address identifies a first endstation, the step of determining domain information comprising the steps of:

creating a first table entry for a first endstation in a first forwarding table of the first switching fabric circuit, the first table entry including domain information specifying that the first endstation is in the first domain;

sharing the first table entry with the second switching fabric circuit via the interswitch link;

creating a second table entry for the first endstation in a second forwarding table of the second switching fabric circuit, the second table entry including domain information specifying that the first endstation is in the first domain; and performing a look-up of the second forwarding table by the second switching fabric circuit to determine the domain information of the first endstation.

11. The method of claim 10, wherein the step of sharing the first table entry comprises the steps of:

creating a packet of forwarding information by a first switching processor of the first switching fabric circuit, the packet of forwarding information including table entries of the second forwarding table; and forwarding the packet of forwarding information to a second switching processor of the second switching fabric circuit via the interswitch link.

12. The method of claim 10, the step of sharing the first table entry comprising the step of:

sending a standard LAN packet to the first port of the first switching fabric circuit via the interswitch link, wherein the domain information of the first endstation is included in a data field of the standard LAN packet.

13. The method of claim 10, wherein the second table entry includes a port of exit mask specifying at least one port of the second switching fabric circuit to which the broadcast packet is forwarded by the second switching fabric circuit.

14. The method of claim 9, wherein the broadcast packet is an implied broadcast packet, the implied broadcast packet being a unicast packet specifying an unknown destination.

15. The method of claim 9, wherein the first port is in the first and second domains.

16. The method of claim 9, wherein the method further comprises the steps of:

determining the domain information of the source if the packet specifies an unknown destination; and forwarding the packet to endstations of the first domain as specified by the domain information of the source.

17. The method of claim 9, wherein the step of creating the first table entry in the first forwarding table comprises the steps of:

receiving forwarding information from a network management endstation coupled to the segmented network, the forwarding information including domain information specifying that the first endstation is in the first domain and port information specifying that the first endstation is coupled to the first port; and updating the first forwarding table to include the forwarding information.

18. A segmented computer network comprising:

an interswitch link, wherein the interswitch link operates according to a local area network (LAN) standard protocol;

a plurality of LAN segments that operate according to the LAN standard protocol;

a plurality of endstations coupled to the LAN segments;

a first switching fabric circuit, the first switching fabric circuit including a first port connected to the interswitch link, a second port coupled to at least one endstation via a first LAN segment and specified as being in a first domain, and a third port coupled to at least one endstation, via a second LAN segment and specified as being in a second domain, the first switching fabric circuit for forwarding a first packet to a port specified by a destination address field of the first packet if the first packet is a unicast packet, the first switching fabric circuit for forwarding the first packet to a port specified by domain information determined from a source address field of the first packet such that isolation between the first and second domains is maintained if the first packet is a broadcast packet;

a second switching fabric circuit, the second switching fabric circuit including a fourth port connected to the interswitch link and a fifth port coupled to at least one endstation via a third LAN segment and specified as being in the first domain.

19. The segmented computer network of claim 18, wherein the first switching fabric circuit comprises:

a first forwarding table for maintaining table entries for each endstation, wherein each table entry includes domain information for each endstation; and a first processor, coupled to the first forwarding table, for performing look-ups in the first forwarding table.

20. The segmented computer network of claim 19, wherein the second switching fabric circuit comprises:

a second forwarding table for maintaining table entries for each endstation, wherein each table entry includes domain information for each endstation; and a second processor, coupled to the second forwarding table, for performing look-ups in the second forwarding table.

21. The segmented computer network of claim 20, wherein the second processor shares table entries of the second forwarding table with the first switching fabric circuit, the second processor for creating a standard LAN packet according to the standard LAN protocol, the standard LAN packet including at least one table entry of the second forwarding table in a data field of the standard LAN packet, the second processor for sending the standard LAN packet to the first switching fabric circuit via the interswitch link.

22. The segmented computer network of claim 21, wherein the second switching fabric circuit includes a sixth port specified as being in the first and second domains.

23. The segmented computer network of claim 18, wherein the first switching fabric circuits equivalently processes broadcast packets, multicast packets, and unicast packets specifying unknown destinations.

24. In a segmented computer network having a first domain and a second domain, a method comprising the steps of:

receiving a packet by a first port of a first switching fabric circuit, the packet including a source address field and a destination address field;

performing a look-up on the destination address field to retrieve destination information for a destination, the destination information including a destination port of exit mask;

performing a look-up on the source address field to retrieve source information for a source, the source information including a source port of exit mask;

comparing the source information to the destination information to produce forwarding information by performing a logical AND operation using the source port of exit mask and the destination port of exit mask as operands to produce a final port of exit mask, the packet being forwarded as specified by the final port of exit mask; and forwarding the packet to at least one port as specified by the forwarding information.

25. The method of claim 24, wherein the destination information further comprises an indicator bit for specifying that the step of comparing the source information to the destination information is to be performed only when the indicator bit is in a first state.

26. A segmented computer network comprising:

an interswitch link, wherein the interswitch link operates according to a local area network (LAN) standard protocol;

a plurality of LAN segments that operate according to the LAN standard protocol;

a plurality of endstations coupled to the LAN segments;

a first switching fabric circuit including a first port connected to the interswitch link, a second port coupled to at least one endstation via a first LAN segment and specified as being in a first domain, and a third port coupled to at least one endstation via a second LAN segment and specified as being in a second domain, the first switching fabric circuit for forwarding a first packet received from the first port to at least one port specified by comparing domain information determined from a source address of the first packet to domain information determined from a destination address of the first packet such that isolation between the first and second domains is maintained; and a second switching fabric circuit, the second switching fabric circuit including a fourth port connected to the interswitch link and a fifth port coupled to at least one endstation via a third LAN segment and specified as being in the first domain, the second switching fabric circuit for sending the first packet.

27. The segmented computer network of claim 26, wherein the first switching fabric circuit comprises:

a first forwarding table for maintaining table entries for each endstation, wherein each table entry includes domain information for each endstation; and a first processor, coupled to the first forwarding table, for determining domain information by performing look-ups in the first forwarding table.

28. The segmented computer network of claim 27, wherein the second switching fabric circuit comprises:

a second forwarding table for maintaining table entries for each endstation, wherein each table entry includes domain information for each endstation; and a second processor, coupled to the second forwarding table, for determining domain information by performing look-ups in the second forwarding table.

29. The segmented computer network of claim 28, wherein the second processor shares table entries of the second forwarding table with the first switching fabric circuit, the second processor for creating a standard LAN packet according to the standard LAN protocol, the standard LAN packet including at least one table entry of the second forwarding table in a data field of the standard LAN packet, the second processor for sending the standard LAN packet to the first switching fabric circuit via the interswitch link.

30. The segmented computer network of claim 29, wherein the second switching fabric circuit includes a sixth port specified as being in the first and second domains.

31. The segmented computer network of claim 29, wherein each table entry comprises a port of exit mask.

32. The segmented computer network of claim 31, wherein performing look-ups based on the destination address field of the first packet results in a destination port of exit mask that specifies at least one port of the first switching fabric circuit to which the first packet is to be forwarded.

33. The segmented computer network of claim 32, wherein performing a look-up based on the source address field of the first packet results in a source port of exit mask that specifies at least one port of the first switching fabric circuit to which broadcasts packets originating from an endstation having the source address are forwarded.

34. The segmented computer network of claim 33, wherein the first switching fabric circuit compares the domain information of the destination address to the domain of the source address by performing a logical AND operation using the source port of exit mask and the destination port of exit mask as operands.

35. The segmented computer network of claim 34, wherein the first packet is a multicast packet specifying less than all the ports of the first switching fabric circuit that are included in the first domain.

36. The segmented computer network of claim 34, wherein the first packet is a unicast packet having a destination address that is not globally unique.

37. In a segmented computer network, a method comprising the steps of:

creating a table entry for a first endstation in a forwarding table of a first switching fabric circuit, the table entry including destination forwarding information specifying a first path to the first endstation and a second path to the first endstation, wherein the endstation is coupled to a second switching fabric circuit;

receiving a packet by a first port of the first switching fabric circuit, the packet including a source address field and a destination address field, the destination address field specifying the first endstation as a destination for the packet;

performing a look-up on the destination address field to retrieve the destination forwarding information for the first endstation;

performing a look-up on the source address field to retrieve source forwarding information of a source of the packet;

comparing the source forwarding information to the destination forwarding information to produce final forwarding information, wherein the final forwarding information specifies only one of the first and second paths;

forwarding the packet to the first endstation via the first path if the final forwarding information specifies the first path; forwarding the packet to the first endstation via the second path if the final forwarding information specifies the second path.

38. The method of claim 37, wherein the destination forwarding information includes a destination port of exit mask and the source forwarding information includes a source port of exit mask.

39. The method of claim 38, wherein the step of comparing the source forwarding information to the destination forwarding information comprises the step of performing a logical AND operation using the source port of exit mask and the destination port of exit mask as operands to produce a final port of exit mask, the packet being forwarded as specified by the final port of exit mask.

40. The method of claim 39, wherein the destination forwarding information further comprises an indicator bit for specifying that the step of comparing the source forwarding information to the destination forwarding information is to be performed only when the indicator bit is in a first state.

41. The method of claim 37, wherein the destination forwarding information further comprises an indicator bit for specifying that the step of comparing the source forwarding information to the destination forwarding information is to be performed only when the indicator bit is in a first state.

42. A segmented computer network comprising:

a first interswitch link;

a second interswitch link;

a first switching fabric circuit including a first port connected to the first interswitch link, a second port coupled to the second interswitch link, and a third port coupled to a first endstation; and a second switching fabric circuit including a fourth port coupled to the first interswitch link, a fifth port coupled to the second interswitch link, and a sixth port coupled to a second endstation, the second switching fabric circuit for creating a table entry for the first endstation in a forwarding table, the table entry including destination forwarding information specifying the first interswitch link as a first path to the first endstation and the second interswitch link as a second path to the first endstation, for receiving a packet from the second endstation, the packet including a source address field and a destination address field, the destination address field specifying the first endstation as a destination for the packet, for performing a look-up on the destination address field to retrieve the destination forwarding information for the first endstation, for performing a look-up on the source address field to retrieve source forwarding information of the second endstation, for comparing the source forwarding information to the destination forwarding information to produce final forwarding information, wherein the final forwarding information specifies only one of the first and second paths, and for forwarding the packet to the first endstation in response to the final forwarding information.

43. The method of claim 42, wherein the destination forwarding information includes a destination port of exit mask and the source forwarding information includes a source port of exit mask.

44. The segmented computer network of claim 43, wherein the second switching fabric circuit compares the source forwarding information to the destination forwarding information by performing a logical AND operation using the source port of exit mask and the destination port of exit mask as operands.

* * * * *